Patented Feb. 6, 1951

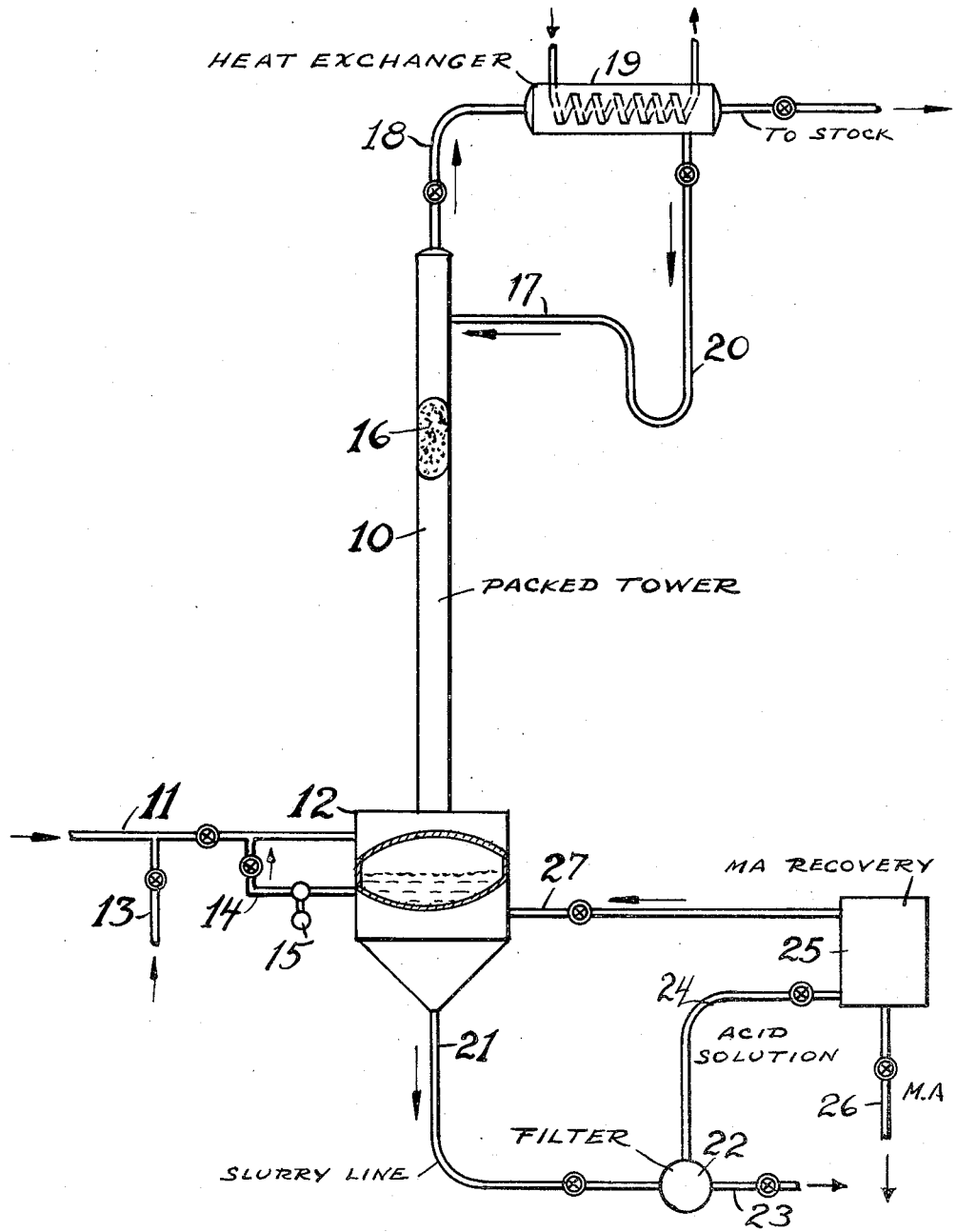

2,540,559

UNITED STATES PATENT OFFICE 2,540,559

RECOVERY OF PHTHALIC AND MALEIC ACID

Albert B. Welty, Jr., Mountainside, N. J., assignor to Standard Oil Development Company, a corporation of Delaware Application December 28, 1945, Serial No. 637,617

2 Claims. (Cl. 260—525)

This invention relates to the recovery of phthalic anhydride from the reaction products of the catalytic vapor phase oxidation of polynuclear or otho substituted single ring aromatic hydrocarbons, and in particular to improvements in the removal of phthalic anhydride from the reaction gases by contact of the gases with water.

In the oxidation of aromatics to prepare phthalic anhydride, and incidentally maleic anhydride, the phthalic anhydride is usually recovered by slowly cooling the reaction stream in large chambers so as to effect the condensation of the phthalic anhydride as such. The reaction stream is usually cooled to about 95–115° F. to precipitate the phthalic anhydride, and subsequently the off gas is scrubbed with water to remove the content of maleic anhydride as an aqueous solution of the acid.

It has been found that the cooling of the reaction products through contact with an aqueous stream has certain advantages compared to the more conventional use of box condensers. However, a tendency to foaming and the formation of incrustations at the vapor inlet end of the recovery system introduce difficulties in operation. The present invention overcomes such difficulties and permits of an easy separation of both phthalic anhydride and maleic anhydride in highly concentrated forms.

It has been found that phthalic anhydride may be removed from the oxidation stream of aromatic compounds by the addition of controlled amounts of water to the gaseous stream, the water thus acting as a cooling, hydrating and precipitating agent. Slurries of particular contents of phthalic acid which may thus be formed have been suggested in the prior art as cooling media, instead of water, for the stream from the oxidation unit. Cooling the oxidation stream in this manner causes the formation of a mist difficult to disperse. In the present invention, the advantages of employing the slurry compositions as cooling media are coupled with obviating the mist formation in the cooler and thereby highly satisfactory processing of the oxidation stream is obtained.

In the present invention, water is passed into the upper portion of a water-scrubbing system for treating the reaction products of the oxidation of aromatics. The quantity used is such as to provide the necessary cooling of the material entering the scrubber. Such cooling is effected by vaporization of the water as it passes down the scrubbing tower, the effect being transmitted thus, progressively, all the way back to the bottom of the scrubber where a slurry accumulates. In this manner, the phthalic anhydride is completely removed from the gaseous stream as a slurry at the base of the scrubber tower. The phthalic anhydride is thus scrubbed from the gaseous stream with water alone and all tendency to form mist is overcome. Moreover, since the aqueous solution at the bottom of the scrubbing tower becomes completely saturated with phthalic acid, the phthalic acid is obtained at the bottom of the tower as a solid material in slurry form.

In order that the invention may be more fully understood, the following description of a particular processing operation is described in relation to the flow diagram presented in Figure 1.

The flow diagram relates to the oxidation of naphthalene and related aromatic hydrocarbons at a temperature from 600° F. to 1000° F. in a chamber containing a vanadium oxide catalyst. In a specific processing unit, naphthalene carried in a stream of air in a concentration of about 2.5 mol per cent is oxidized to produce 10,000 pounds per day of phthalic anhydride. The exit gases from the catalyst chamber may be passed directly to the product recovery system of this invention or partially cooled in a waste heat boiler before entering the recovery system. In the drawing, the exit gases are shown as being passed through line 11 to the lower portion 12 of the product recovery or scrubbing system consisting essentially of a tower 10. In the specific embodiment, the temperature of the gaseous stream entering the system at 11 is 875° F. Sufficient steam is introduced into the line 11 through T 13 to reduce the dew point with respect to water below that with respect to phthalic anhydride, thus minimizing any tendency for solids to accumulate at the subsequent quench point. The tower 10 is usually maintained at a temperature between 150° F. and 180° F. This temperature is dependent on the amount of water vapor it is desired to "lose" up the tower. The higher the temperature, the more carried with the fixed gas. The amount of water carried overhead from the tower must equal or nearly equal the total amount of water added to the system, else the slurry will become too dilute. A portion of the aqueous slurry contained in section 12 of the scrubbing system 10 is withdrawn through line 15 and injected into line 11 through line 14. The slurry so injected partially quenches the product gases, but it also serves to keep line 11 free of incrustation at the point of introduction to the scrubbing system. In the particular operation in which 2.5 mols of naphthalene are oxidized in the presence of 97.5 mols of air, the stream passing from the reactor through line 11 into the portion 12 of scrubbing equipment has the following composition on a feed rate per hour basis:

Phthalic anhydride ____ 417 lbs.
Maleic anhydride _____ 35 lbs.
Steam [1] _____ 218 lbs. (11,800 cu. ft.)
Non-condensibles _____ 128,000 cubic feet ---
[1] Exclusive of extraneous steam introduced through line 13.

The temperature in the lower portion of the scrubber system designated by the numeral 12 is above 164° F. At this temperature, the gas in the scrubber system 10 contains about 33% by volume of steam.

The gaseous composition from the portion 12 of the scrubber passes upwards through the packed tower portion 16 of the scrubber system 10. This stream passes countercurrent to the stream of water flowing at the rate of about 1,000 pounds per hour admitted through line 17. In general, the weight of water added to the tower 10 is from 0.3 to 3 times the weight of the phthalic anhydride in the feed gases to the tower, but as already indicated the actual amount will be such as to supply the necessary cooling for the system. In passing through the portion 16 of the scrubbing system, the temperature drops slightly by heat exchange with the water so that the temperature at the top of the tower is about 164° F. The vapor issuing from the top of the tower through line 18 is generally cooled, say, to 100–120° F. by means of a heat exchanger 19 having a cooling surface of about 400 square feet, that is capable of handling about 1,000,000 B. t. u.'s per hour, and the water thus condensed is returned to the tower via line 17. In some cases, however, in which the water supply is substantially pure, that is, leaves no undesirable residue upon evaporation, the heat exchanger 19 may be eliminated and the water allowed to escape from the tower along with the water entering the system in the reaction products. In this case, of course, fresh makeup water is added continuously.

Within the lower portion of the tower 12 the slurry accumulates which contains both phthalic acid and maleic acid. In order that the slurry may be conveniently handled, the lower portion of the scrubber 12 is conical so that the slurry may be conveniently collected and passed through the bottom line 21. The slurry is then passed to filter 22. The crude phthalic acid is thus obtained and is subsequently dehydrated to the anhydride. Upon the basis of the figures previously given, phthalic acid equivalent to about 417 pounds of phthalic anhydride is obtained per hour through line 23. The solution from the filter is passed through line 24 into a maleic anhydride recovery system 25. In this recovery system the maleic acid solution may be cooled and the maleic acid obtained by crystallization. The crude maleic acid is obtained through line 26, and it, too, is subsequently purified and dehydrated. The residual solution from the maleic acid recovery system is passed through line 27 to the bottom portion 12 of the recovery system.

The above example is for descriptive purposes only, and the invention is not to be limited thereto.

What is claimed is:

1. In a process for recovering phthalic anhydride and maleic acid from oxidation reaction products of an aromatic hydrocarbon, wherein a vapor stream containing phthalic anhydride and maleic acid vapors with noncondensible gases and steam is intimately contacted with an aqueous solution that is saturated with phthalic anhydride and maleic acid so that the anhydride and acid vapors undergo condensation to form an aqueous slurry in said solution, the improvement which comprises contacting the said vapor stream of the reaction products with the aqueous slurry at a temperature above 164° F. to about 180° F. to obtain partial condensation of the anhydride and acid vapors in the presence of the slurry so as to leave a remaining uncondensed portion of said vapor stream containing some phthalic anhydride and maleic acid anhydride vapors, the noncondensible gases and steam, passing said uncondensed portion of the vapor stream upwardly through a scrubbing zone in which temperatures are maintained from about 100° F. to 150° F., contacting said vapor stream in the scrubbing zone with countercurrently flowing water reflux which is substantially less in amount than the amount of steam passed through the scrubbing zone, flowing the resulting solution of recovered anhydride and acid vapors in said water reflux from a bottom part of said scrubbing zone into the aqueous slurry, removing water vapor from the upper part of said scrubbing zone, partially condensing the thus removed water vapor to obtain said water reflux, returning the water reflux to the upper part of the scrubbing zone, withdrawing from the system the remaining portion of uncondensed water vapor that leaves the upper part of the scrubbing zone in an amount equivalent to the amount of steam entering into contact with the aqueous slurry so that the aqueous slurry is prevented from becoming further diluted with water, and separating the phthalic anhydride and maleic acid from said aqueous slurry enriched in the phthalic anhydride and maleic acid, both partially condensed on contact therewith and added thereto by the water reflux solution from the scrubbing zone.

2. The method as described in claim 1 in which the water reflux returned to the scrubbing zone is an amount from 0.3 to 3 times by weight of the amount of phthalic anhydride vapor entering the scrubbing zone.

ALBERT B. WELTY, Jr.

REFERENCES CITED

The following references are of record in the file of this patent:

UNITED STATES PATENTS

| Number | Name | Date |
|---|---|---|
| 2,071,329 | Brown | Feb. 23, 1937 |
| 2,071,357 | Porter | Feb. 23, 1937 |
| 2,098,047 | Jaeger et al. | Nov. 2, 1937 |
| 2,128,323 | Rogers et al. | Aug. 30, 1938 |
| 2,190,001 | Talbert | Feb. 13, 1940 |
| 2,220,044 | Jaeger | Oct. 29, 1940 |